(12) United States Patent
Nandi et al.

(10) Patent No.: US 11,687,581 B2
(45) Date of Patent: Jun. 27, 2023

(54) INFORMATION EXTRACTION, ENRICHMENT, AND CACHING FRAMEWORK FOR AUGMENTED REALITY APPLICATIONS

(71) Applicant: Ohio State Innovation Foundation, Columbus, OH (US)

(72) Inventors: Arnab Nandi, Columbus, OH (US); Ritesh Sarkhel, Columbus, OH (US); Codi Burley, Grove City, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/208,201

(22) Filed: Mar. 22, 2021

(65) Prior Publication Data
US 2021/0365491 A1 Nov. 25, 2021

Related U.S. Application Data

(60) Provisional application No. 63/028,816, filed on May 22, 2020.

(51) Int. Cl.
*G06F 16/538* (2019.01)
*G06F 16/54* (2019.01)
(Continued)

(52) U.S. Cl.
CPC ......... *G06F 16/538* (2019.01); *G06F 16/535* (2019.01); *G06F 16/54* (2019.01); *G06F 16/9574* (2019.01); *G06V 20/20* (2022.01)

(58) Field of Classification Search
CPC .. G06F 16/538; G06F 16/9574; G06F 16/535; G06F 16/54
(Continued)

(56) References Cited

U.S. PATENT DOCUMENTS

| 2011/0055202 A1* | 3/2011 | Heimendinger | G06F 16/245 706/14 |
| 2013/0035581 A1 | 2/2013 | Vesto | |

(Continued)

OTHER PUBLICATIONS

Leilani Battle, Remco Chang, and Michael Stonebraker. 2016. Dynamic prefetching of data tiles for interactive visualization. In Proceedings of the 2016 International Conference on Management of Data. 1363-1375.

(Continued)

*Primary Examiner* — Kimberly L Wilson
(74) *Attorney, Agent, or Firm* — Meunier Carlin & Curfman LLC (57) ABSTRACT

An end-to-end software framework is provided for information extraction, enrichment, and caching in applications that involve exploring real-world data through a camera-based viewport in an augmented reality (AR) setting. It allows users to gather supplementary information through cross-modal data fusion against cloud-based datastores. Additional context is provided by retrieving data units from remote datastores that are relevant to the queried item. Given that such datastores often do not fit in main memory, a client-server architecture is used. Users interact with real-world objects via a camera-enabled client interface, and queries are executed using gesture-based interactions as supplementary information is retrieved from a back-end server (if necessary) and overlaid in the client's live camera-view.

15 Claims, 8 Drawing Sheets

(51) Int. Cl.
G06F 16/535 (2019.01)
G06F 16/957 (2019.01)
G06V 20/20 (2022.01)

(58) Field of Classification Search
USPC .......................................................... 707/722
See application file for complete search history.

(56) References Cited

U.S. PATENT DOCUMENTS

| | | | | |
|---|---|---|---|---|
| 2015/0127599 | A1* | 5/2015 | Schiebeler | G06F 16/24552 707/602 |
| 2016/0378861 | A1* | 12/2016 | Eledath | G06T 19/006 707/766 |
| 2017/0124474 | A1* | 5/2017 | Kashyap | G06N 20/00 |
| 2019/0026635 | A1* | 1/2019 | Wang | G06N 5/04 |
| 2021/0160337 | A1* | 5/2021 | Chandrasekaran | H04L 67/2842 |

OTHER PUBLICATIONS

Rajesh Bordawekar, Bortik Bandyopadhyay, and Oded Shmueli. 2017. Cognitive database: A step towards endowing relational databases with artificial intelligence capabilities. 14 pages.

Codi J Burley and Arnab Nandi. 2019. ARQuery: Hallucinating Analytics over Real-World Data using Augmented Reality. In CIDR. 9 pages.

Federico Castanedo. 2013. A review of data fusion techniques. The Scientific World Journal 2013. 20 pages.

Quang Dong. 2017. Skip the Line: Restaurant Wait Times on Search and Maps. Google Blog. 4 pages.

Raul Castro Fernandez and Samuel Madden. 2019. Termite: a system for tunneling through heterogeneous data. In Proceedings of the Second International Workshop on Exploiting Artificial Intelligence Techniques for Data Management. 1-8.

Henry Fuchs, Mark A Livingston, Ramesh Raskar, Kurtis Keller, Jessica R Crawford, Paul Rademacher, Samuel H Drake, and Anthony A Meyer. 1998. Augmented Reality Visualization for Laparoscopic Surgery. MICCAI (1998). 10 pages.

Michael Günther, Maik Thiele, and Wolfgang Lehner. 2019. Fast Approximated Nearest Neighbor Joins for Relational Database Systems. BTW 2019. 225-244.

Anders Henrysson and Mark Ollila. 2004. UMAR: Ubiquitous Mobile Augmented Reality. MUM (2004). 5 pages.

Quoc Le and Tomas Mikolov. 2014. Distributed representations of sentences and documents. In International conference on machine learning. 1188-1196.

David G Lowe. 1999. Object recognition from local scale-invariant features. In Proceedings of the seventh IEEE international conference on computer vision, vol. 2. IEEE, 1150-1157.

Jiasen Lu, Dhruv Batra, Devi Parikh, and Stefan Lee. 2019. Vilbert: Pretraining task-agnostic visiolinguistic representations for vision-and-language tasks. In Advances in Neural Information Processing Systems. 13-23.

Aude Oliva and Antonio Torralba. 2001. Modeling the shape of the scene: A holistic representation of the spatial envelope. International journal of computer vision 42, 3 (2001), 145-175.

Peter Pirolli and Stuart Card. 2005. The sensemaking process and leverage points for analyst technology as identified through cognitive task analysis. In Proceedings of international conference on intelligence analysis, vol. 5. McLean, VA, USA, 2-4.

Juan Ramos et al. 2003. Using tf-idf to determine word relevance in document queries. In Proceedings of the first instructional conference on machine learning, vol. 242. Piscataway, NJ, 133-142.

Ritesh Sarkhel, Nibaran Das, Aritra Das, Mahantapas Kundu, and Mita Nasipuri. 2017. A multi-scale deep quad tree based feature extraction method for the recognition of isolated handwritten characters of popular indic scripts. Pattern Recognition 71 (2017), 78-93.

Thirumuruganathan, Saravanan, et al. "Data. Curation with Deep Learning." EDBT. Mar. 30-Apr. 2, 2020. ISBN 978-3-89318-083-7 on OpenProceedings.org. Distribution of this paper is permitted under the terms of the Creative Commons Ticense CC-by-nc-nd 4.0.

Ashish Vaswani, Noam Shazeer, Niki Parmar, Jakob Uszkoreit, Llion Jones, Aidan N Gomez, Łukasz Kaiser, and Illia Polosukhin. 2017. Attention is all you need. In Advances in neural information processing systems. 5998-6008.

Egui Zhu, Arash Hadadgar, Italo Masiello, and Nabil Zary. 2014. Augmented Reality in Healthcare Education: An Integrative Review. PeerJ e469.

* cited by examiner

INFORMATION EXTRACTION, ENRICHMENT, AND CACHING FRAMEWORK FOR AUGMENTED REALITY APPLICATIONS

CROSS-REFERENCE TO RELATED APPLICATIONS

This application claims the benefit of U.S. provisional patent application No. 63/028,816, filed on May 22, 2020, and entitled "AN INFORMATION EXTRACTION, ENRICHMENT, AND CACHING FRAMEWORK FOR AUGMENTED REALITY APPLICATIONS," the disclosure of which is expressly incorporated herein by reference in its entirety.

STATEMENT OF GOVERNMENT SUPPORT

This invention was made with government support under Award Number 1910356, awarded by National Science Foundation. This invention was made with government support under Award Number 1453582, awarded by National Science Foundation. The government has certain rights in the invention.

BACKGROUND

Despite the recent boom of the world wide web, a significant amount of information appears in the physical world. Whether it is ordering from a paper-printed menu in the restaurant, looking up an event from a poster, or reading up a critic's review of a painting in the museum, useful information is often embedded within real-world objects. Often this information is ad-hoc i.e., they do not appear in an indexed database and/or cannot be accessed digitally due to third-party ownership, leaving no other option but to perform the mental calculation for extracting relevant information. Furthermore, such data often appear in isolation. Lack of sufficient context makes it difficult to gather critical insights and delays decision-making. For example, ordering from a menu would be much easier if one were able to filter out those items that contain known allergens or sort them based on recent reviews and listed prices. However, supplementary information such as ingredient lists or customer reviews may not always be readily available to facilitate these tasks. To retrieve such information, users may have to query multiple cloud-based datastores, aggregate those results, and perform mental calculations to gather insights.

It is with respect to these and other considerations that the various aspects and embodiments of the present disclosure are presented.

SUMMARY

An end-to-end software framework is provided for information extraction, enrichment, and caching in applications that involve exploring real-world data through a camera-based viewport in an augmented reality (AR) setting. It allows users to gather supplementary information through cross-modal data fusion against cloud-based datastores. Additional context is provided by retrieving data units from remote datastores that are relevant to the queried item. Given that such datastores often do not fit in main memory, a client-server architecture is used. Users interact with real-world objects via a camera-enabled client interface, and queries are executed using gesture-based interactions as supplementary information is retrieved from a back-end server and overlaid in the client's live camera-view.

In an implementation, method comprises: receiving real-world data at a viewport of a computing device; receiving a client selection of an item of the real-world data; retrieving data relating to the item from storage; and presenting the data in the client viewport with at least some of the real-world data.

In an implementation, a system comprises: a datastore comprising data relating to items in a real-world; and a computing device configured to: receive real-world data from a viewport; receive a client selection of an item of the real-world data; retrieve data relating to the item from storage; and present the data to the client viewport with at least some of the real-world data.

In an implementation, a system comprises: a middleware cache; a cache manager; and a prediction engine configured to receive a query from a client running an augmented reality application, wherein the query pertains to an item in a real-world, and configured to send the query to the cache manager for retrieval of a data result for the query from the middleware cache.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Augmented reality (AR), a technology to overlay a live view of the physical world with digital information, offers a new paradigm to explore real-world data leveraging live camera-view and gesture-based interactions. Immersive experience offered by AR-based devices has been proved to be useful for several applications including education, medicine, and emergency services.

An end-to-end software framework is provided to query real-world data through a camera-based viewport in an augmented reality setting. It allows users to gather supplementary information by cross-modal data fusion against cloud-based datastores. Additional contextual information is gathered by retrieving data-units from remote datastores, relevant to the queried item. Given that such datastores often do not fit in main memory, a client-server architecture is employed for these operations. Users interact with real-world objects via a camera-enabled client interface, queries are executed using gesture-based interactions, and supplementary information is retrieved from a back-end server, overlaid in the client's live camera-view. There are a number of technical challenges that need to be addressed to realize this framework. To better understand these challenges, a real-life application of interactive data exploration is described with respect to FIGS. 1 and 2.

Figure 1:
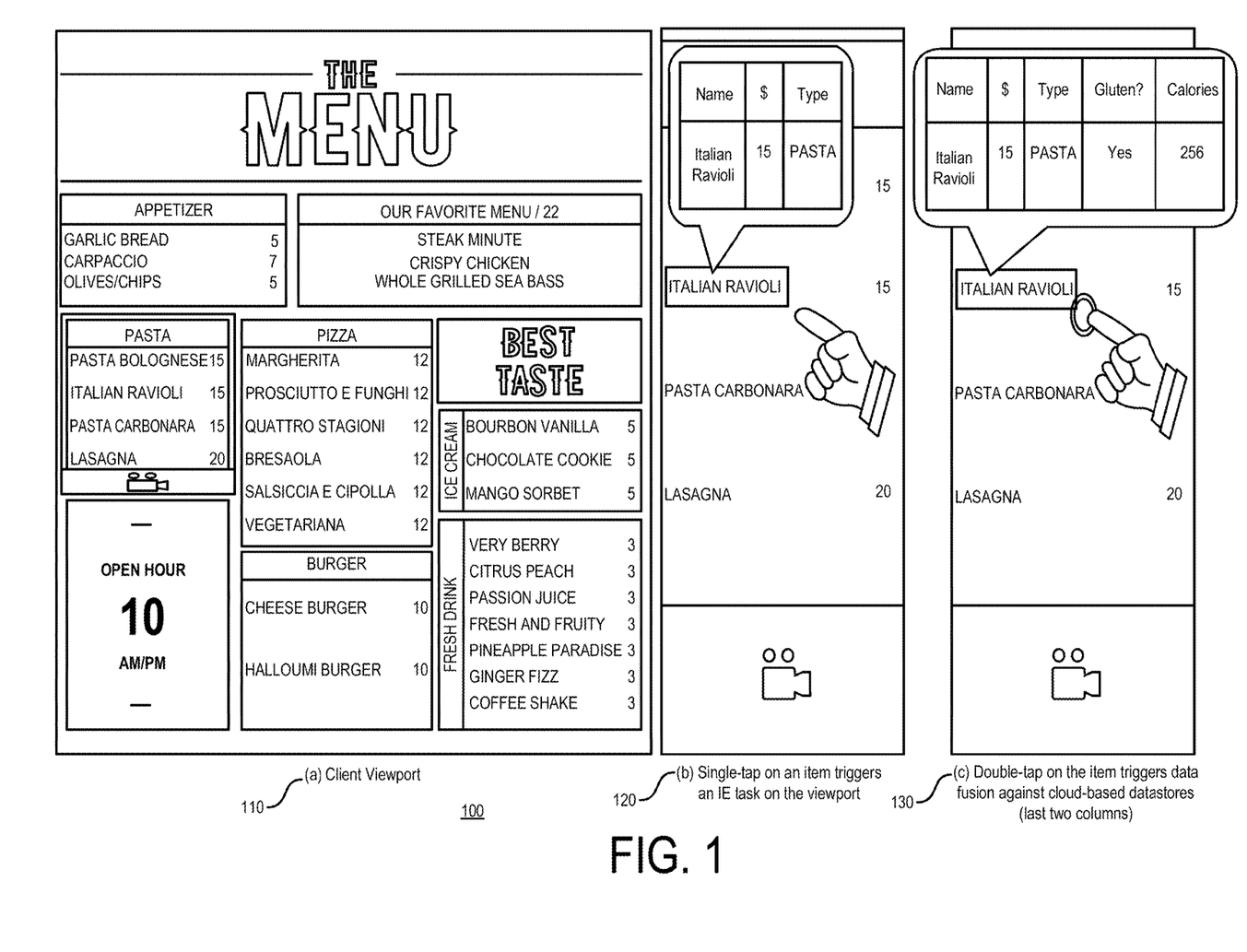
FIG. 1 is an example that is useful for describing aspects of information extraction, enrichment, and caching for augmented reality (AR) applications.

FIG. 1 is an example 100 that is useful for describing aspects of information extraction, enrichment, and caching for AR applications. For example, a user has decided to visit a local cafe. The user wants to make sure that they stay on budget and be mindful of their food allergies. However, the user does not recognize the items on the menu and has limited knowledge of the ingredients used to prepare them. Conventionally, this leaves them no option but to go through each item on the menu and look up its allergenic information manually.

Using aspects of systems and methods provided herein, instead of using the conventional technique noted above, the user (a) views the menu 110 through a client viewport, such as handheld computing devices, AR-enabled smartphone etc. and selects the item(s) they are interested to know more about using the inbuilt AR-interface of their personal device. For example, if they are interested in "Italian Ravioli", they (b) select it on (e.g., by a single tap on the viewport). As shown in 120, this action triggers an information extraction task in their current viewport, retrieving two named entities 'Food-type' and 'Price'. Results are computed and rendered in a tabular form in their camera-view. Each column is labeled as a named entity type.

To retrieve supplementary information such as calorific value or allergenic information, the user can (c) perform another selection (e.g., a double tap of the item) on their camera-interface. This triggers a cross-modal data fusion operation against a set of nutrition databases in a back-end server. Relevant supplementary data is retrieved from these databases and rendered in live camera-view as shown in 130. With the retrieved information visualized in a tabular format, the user also has the flexibility to gather insights by executing analytical queries (e.g. sorting, comparison, filtering) on the result-set.

Thus, in this example, ordering from a printed menu using the AR-enabled interface described herein allows the user to perform analytical queries on each item in the viewport using gesture-based interactions. Supplementary information can also be retrieved from cloud-based datastores by double tapping the item for additional context.

Figure 2:
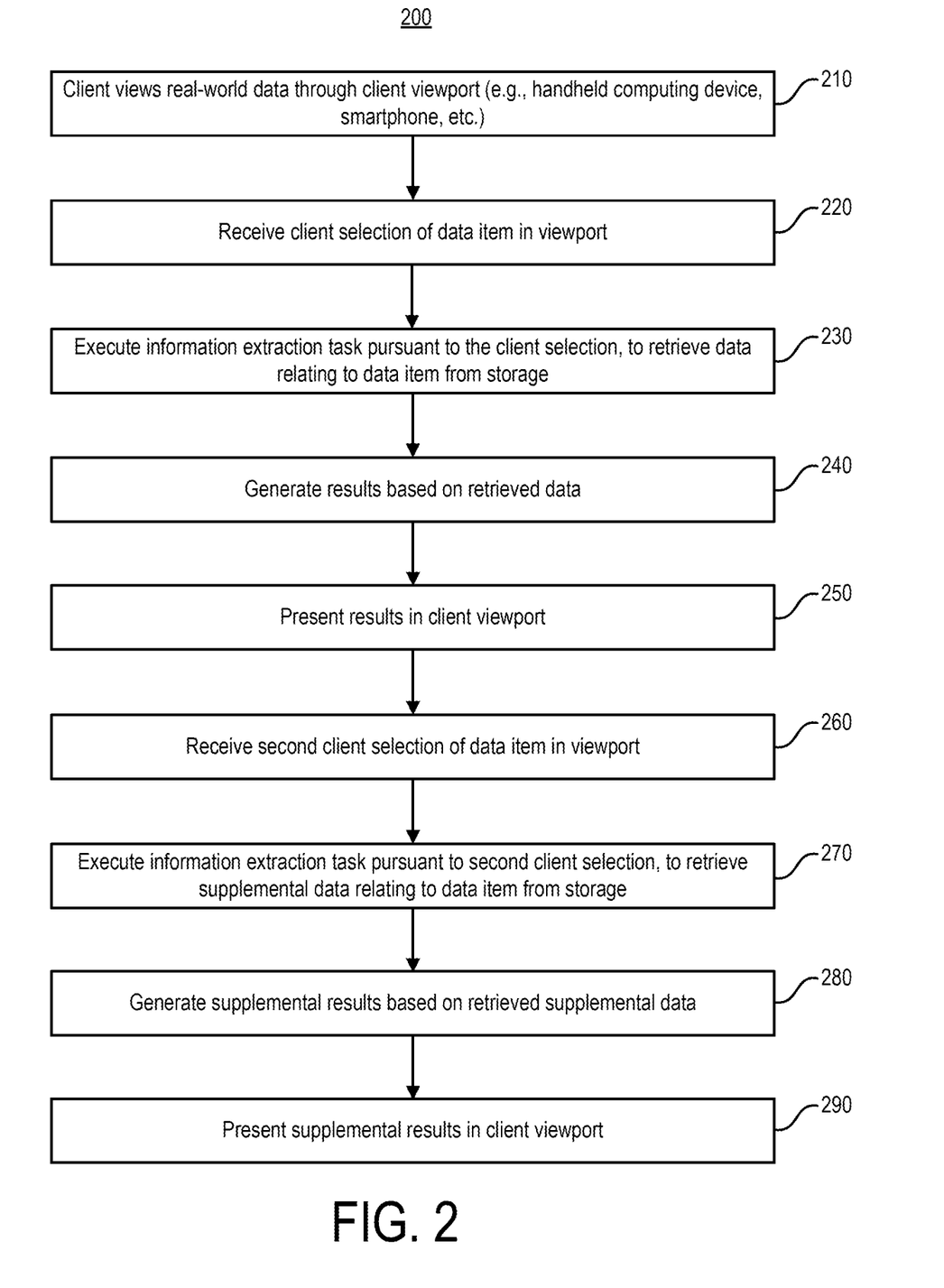
FIG. 2 is an operational flow of an implementation of a method for information extraction, enrichment, and caching for AR applications.

FIG. 2 is an operational flow of an implementation of a method 200 for information extraction, enrichment, and caching for AR applications. At 210, a client view real-world data (e.g., a menu, a sign, a travel brochure, text, a picture, a plant, an animal, an object, etc.) through a client viewport, such as an image-finder on a handheld computing device, camera, smartphone, etc.

The client makes a selection of a data item in the viewport. Selection may be made by any conventional technique, such as by tapping with a finger or stylus on the item in the viewport to be selected, or otherwise highlighting, indicating, and/or actuating a selection. At 220, the client selection is received, e.g., by an app of a computing device integral to the client viewport such as an app on the handheld computing device, camera, smartphone, etc., or at a remote computing device, depending on the implementation.

At 230, the computing device (or app, depending on the implementation) executes an information extraction task on the client selection, to retrieve data relating to the selected data item from storage, such as a remote database or other storage devices.

At 240, the computing device and/or app generates results based on the retrieved data, and at 250 sends the results for display or other presentation in the client viewport.

In some implementations, the client may make a second selection of a data item in the viewport. At 260, the second client selection is received, e.g., by an app of a computing device integral to the client viewport such as an app on the handheld computing device, camera, smartphone, etc., or at a remote computing device, depending on the implementation.

At 270, the computing device (or app, depending on the implementation) executes an information extraction task on the second client selection, to retrieve supplemental data relating to the data item from storage, such as a remote database or other storage device.

At 280, the computing device and/or app generates supplemental results based on the retrieved data, and at 290 sends the supplemental results for display or other presentation in the client viewport.

There are several technical challenges to address to develop such a framework for real-world applications.

One challenge is that real-world data is multimodal in nature. Depending on the task, a user may execute a query to retrieve the supplementary information of the calorific value of an item in the printed menu. The same query can be executed on the image of a dish as well. Hence, a framework that allows users to explore data in the real-world should handle the multimodality of the queries gracefully.

Another challenge is that data often appears in isolation in the real-world. Supplementary information needed for additional context may not always appear within the viewport. However, they can be retrieved from cloud-based datastores. Owned by third-party entities, these datastores can be heterogeneous themselves. The data they contain can be multimodal as well. Retrieving relevant information from such heterogeneous datastores is a challenging task itself.

Moreover, to ensure a seamless experience, the turnaround time from issuing a query to the rendering of results on top of live camera-view needs to be less than the required interactive latency also.

Figure 3:
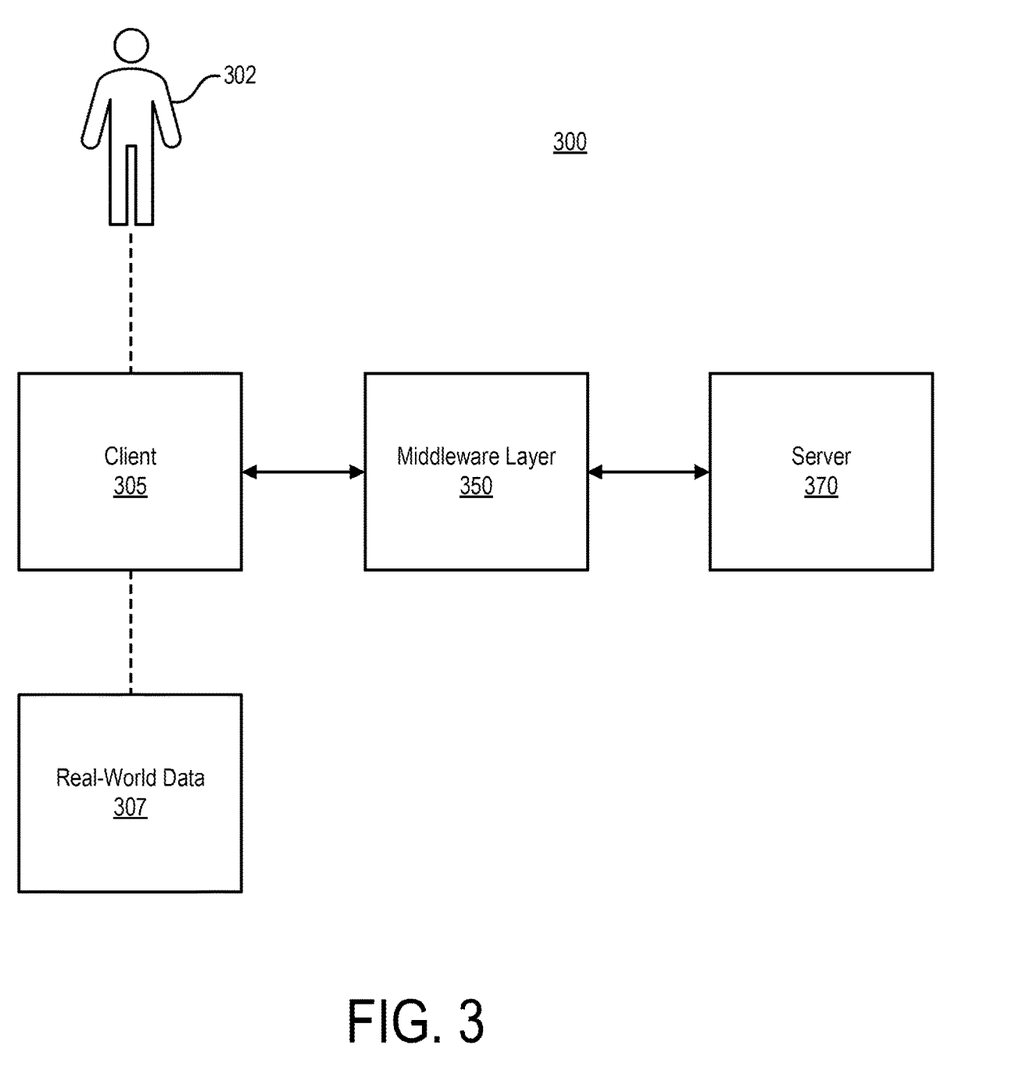
FIG. 3 is an illustration of an exemplary environment for information extraction, enrichment, and caching for AR applications.

FIG. 3 is an illustration of an exemplary environment 300 for information extraction, enrichment, and caching for AR applications. A user 302 uses a client 305 to access real-world data 307. The client 307 is in communication with a middleware layer 350 which is in communication with a server 370, through one or more networks. These components and their interactions are described further herein. The network(s) may be a variety of network types including the public switched telephone network (PSTN), a cellular telephone network, and a packet switched network (e.g., the Internet). Although only one client 305, one middleware layer 350, and one server 370 are shown in FIG. 3, there is no limit to the number of client clients 305, middleware layers 350, and servers 370 that may be supported.

The client 305, the middleware layer 350, and the server 370 may be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 9 as the computing device 900.

Figure 4:
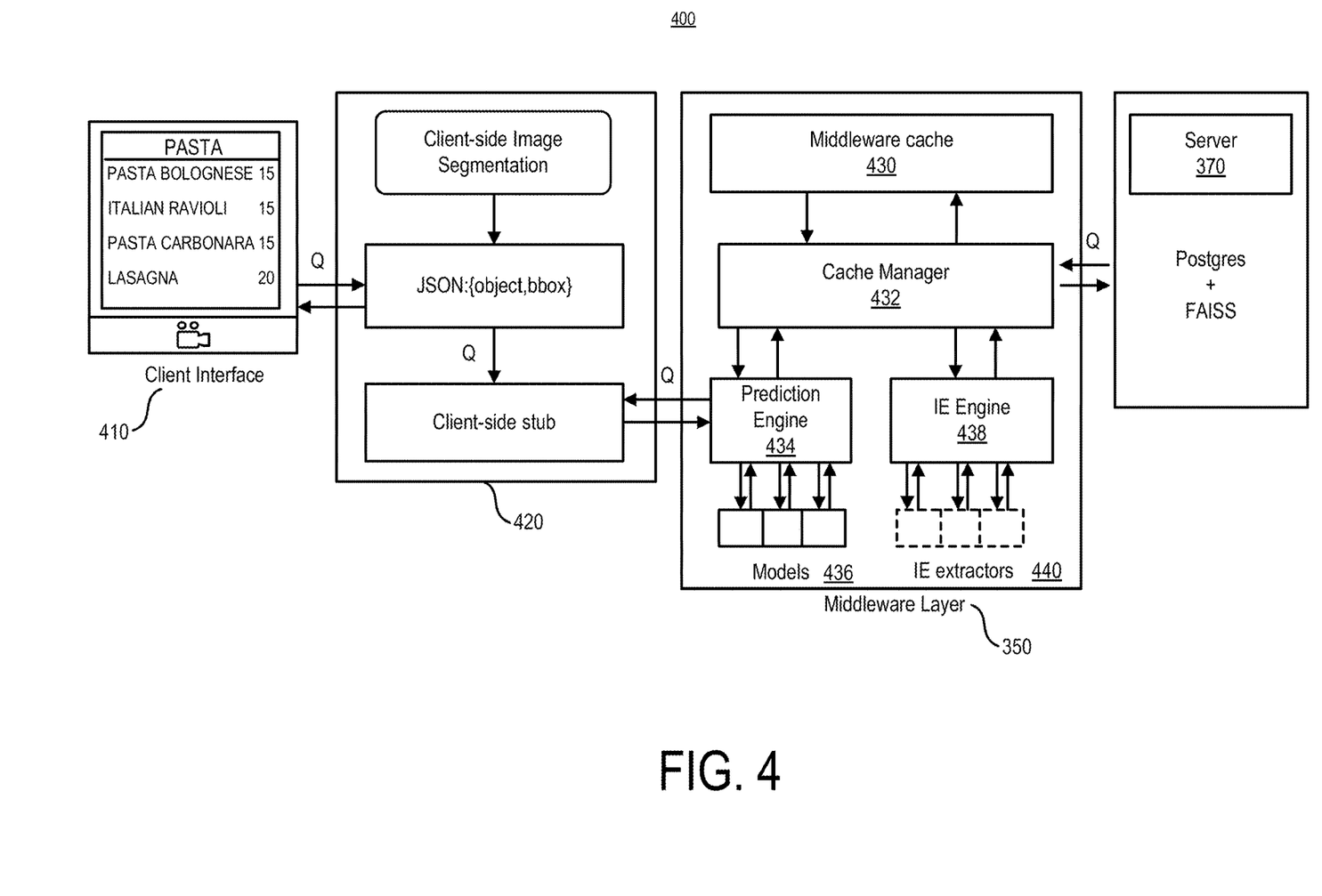
FIG. 4 is an illustration of an implementation of an architecture for information extraction, enrichment, and caching for AR applications.
Figure 5:
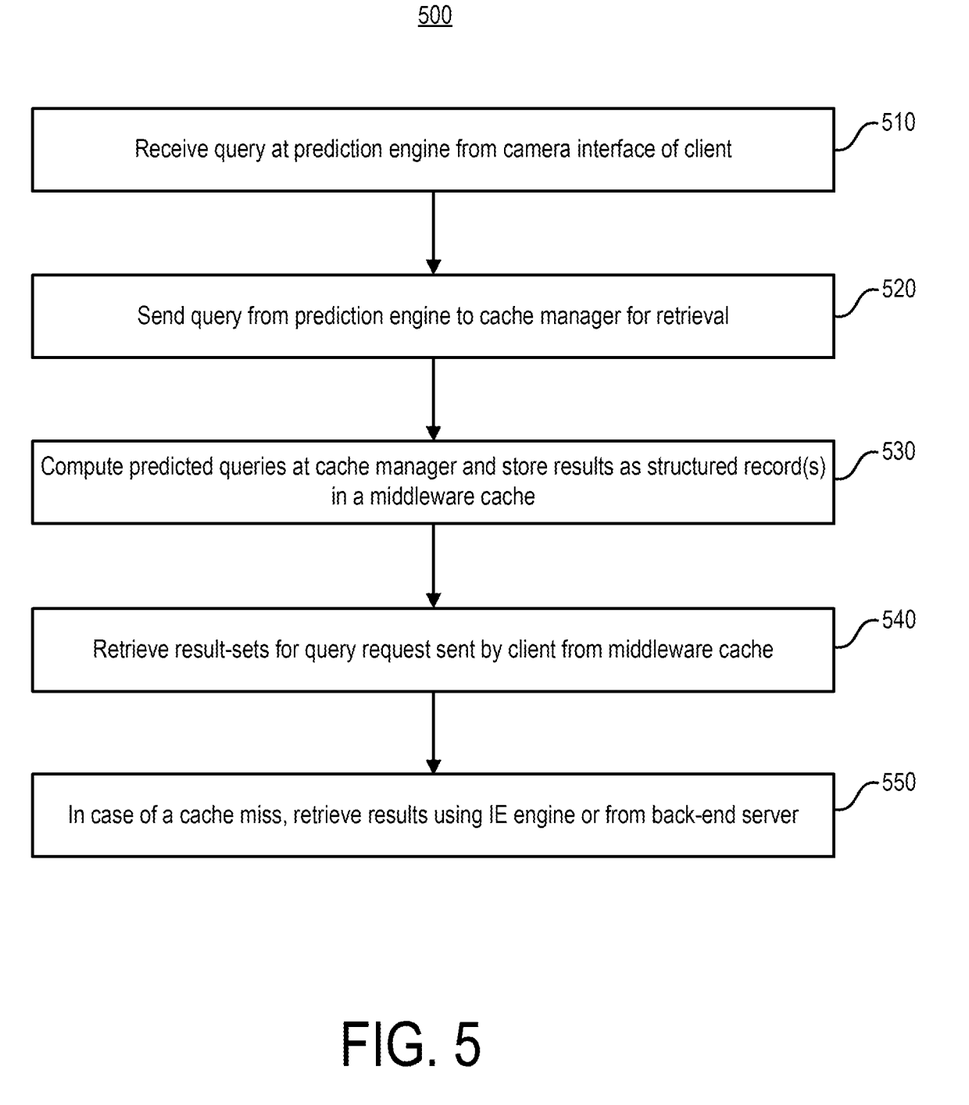
FIG. 5 is an operational flow of another implementation of a method for information extraction, enrichment, and caching for AR applications.

FIG. 4 is an illustration of an implementation of an architecture 400 for information extraction, enrichment, and caching for AR applications. FIG. 5 is an operational flow of an implementation of a method 500 for information extraction, enrichment, and caching for AR applications.

An implementation of an architecture 400 is described. FIG. 4 provides an overview of an implementation of a client-server architecture 400. The framework comprises primary components as illustrated in FIG. 4, an AR-enabled camera interface 410 and an image segmentation engine 420 on the client (e.g., the client 305 of FIG. 3); an information extraction (IE) engine 438, a prediction engine 434, and a cache manager 432 of a middleware cache 430 in the middleware layer, and a back-end server 370.

At 510, the camera interface 410 (e.g., a visualizer) sends queries (each query being a request based on a selected real-world item or object) to the prediction engine 434. At 520, the prediction engine 434 then sends these queries (i.e., requests) to the cache manager 432 for retrieval. To anticipate the user's future requests, the prediction engine 434 also sends predictions to the cache manager 432 to be fetched ahead of time. At 530, the cache manager 432 computes the predicted queries and stores the results as a structured record in the middleware cache 430. At 540, result-sets for query requests sent by the client are retrieved from the middleware cache 430. At 550, in case of a cache miss, the queries are serviced, and results obtained by the information extraction (IE) engine 438 (e.g., foraging), or retrieved from the back-end server 370 (e.g., fusion).

The client has two main components, an AR-enabled camera interface 410 and an image segmentation engine 420. The camera-enabled interface 410 has two main responsibilities. First, it helps the middleware to formulate a query by interpreting the gesture-based interaction and identifying the queried object. Second, it also renders the result-set returned by the middleware as an overlay on top of the live camera-view by tracking the queried object. A client application may be developed, in an implementation, using the ARKit library and Swift framework. The task of tracking an object in camera-view and formulating the queries is the responsibility of the image segmentation engine 420. This is a client-side pretrained model that identifies the categories of objects that appear in the user's current viewport as well as their relative coordinates. This is then sent to the prediction engine 434 as a JSON object. The object queried by the user is identified using a special flag. A lightweight deep neural network may be used and trained on a large corpus of gold-standard data using the CoreML framework to implement the image segmentation engine 420.

The middleware layer 350 has three main components, a prediction engine 434, an IE engine 438, and a cache manager 432. When issued a query from the client interface, the prediction engine 434 looks up the main-memory cache for a precomputed result-set. If not found, the result-set is computed by IE engine 438 or retrieved from the back-end server 370.

In case of a retrieval query, the IE engine 438 takes the responsibility of extracting named entities that are semantically related to the queried object from the current viewport in this case. The IE engine 438 comprises a number of extractor modules (IE extractors 440) that run in parallel to each other. Each module is responsible for extracting a separate named entity. The extractor modules can be heuristics-based, rule-based or learned using state-of-the-art deep neural networks depending on the task, given that it satisfies the constraint of acceptable interactive latency. Once the named entities are extracted, they are returned as a structured record containing (named entity type, value) pairs.

If there is a cache miss by the prediction engine 434 when computing the result-set of a fusion query, it needs to be retrieved from the datastores in the back-end server 370. Named entities relevant to the queried object are retrieved from the datastores and returned as a structured record containing (supplementary named entity type, value) pairs.

The prediction engine 434 comprises two prediction models 436 that run in parallel to each other. The first model infers the current user analysis phase, while the second model infers the next user interaction in the client interface. The cache allocation strategy depends on the output of the first prediction model, whereas the second model predicts the next queries with high probability. The user's past interaction log as well as the semantic relationship between the objects appearing in the current viewport is taken into consideration for this purpose. Results of these queries are computed ahead of time and stored in the main memory cache.

Regarding the server 370, to gather relevant supplementary information about a real-world object, a cross-modal fusion against remote datastores may be executed by the client. If the result-set is not precomputed and stored in the cache, retrieve it from the back-end server. Assume that each datastore consists of several data units. For example, in case of relational databases, a relational tuple constitutes a data unit as presently defined.

An objective is to retrieve k most relevant data units from the datastore. If the server 370 contains indexed, structured datastores, extract the value of the indexing attribute for the queried object and search for a match in the index structure. For non-indexed but structured and unstructured datastores, represent each data unit as a fixed-length embedding vector. The queried object is also represented as a fixed-length vector ($v_q$). The task of retrieving the most similar data units then resolves down to an approximate nearest neighbor search based on the pairwise cosine similarity between the query vector $v_q$ and the fixed-length vectors representing each data unit. Any well-known technique may be used to optimize the similarity search between two vectors. PostgreSQL, for example, may be used as the back-end database management system (DBMS) for relational databases, though this is not intended to be limiting as any well-known back-end DBMS for relational databases may be used depending on the implementation.

Figure 6:
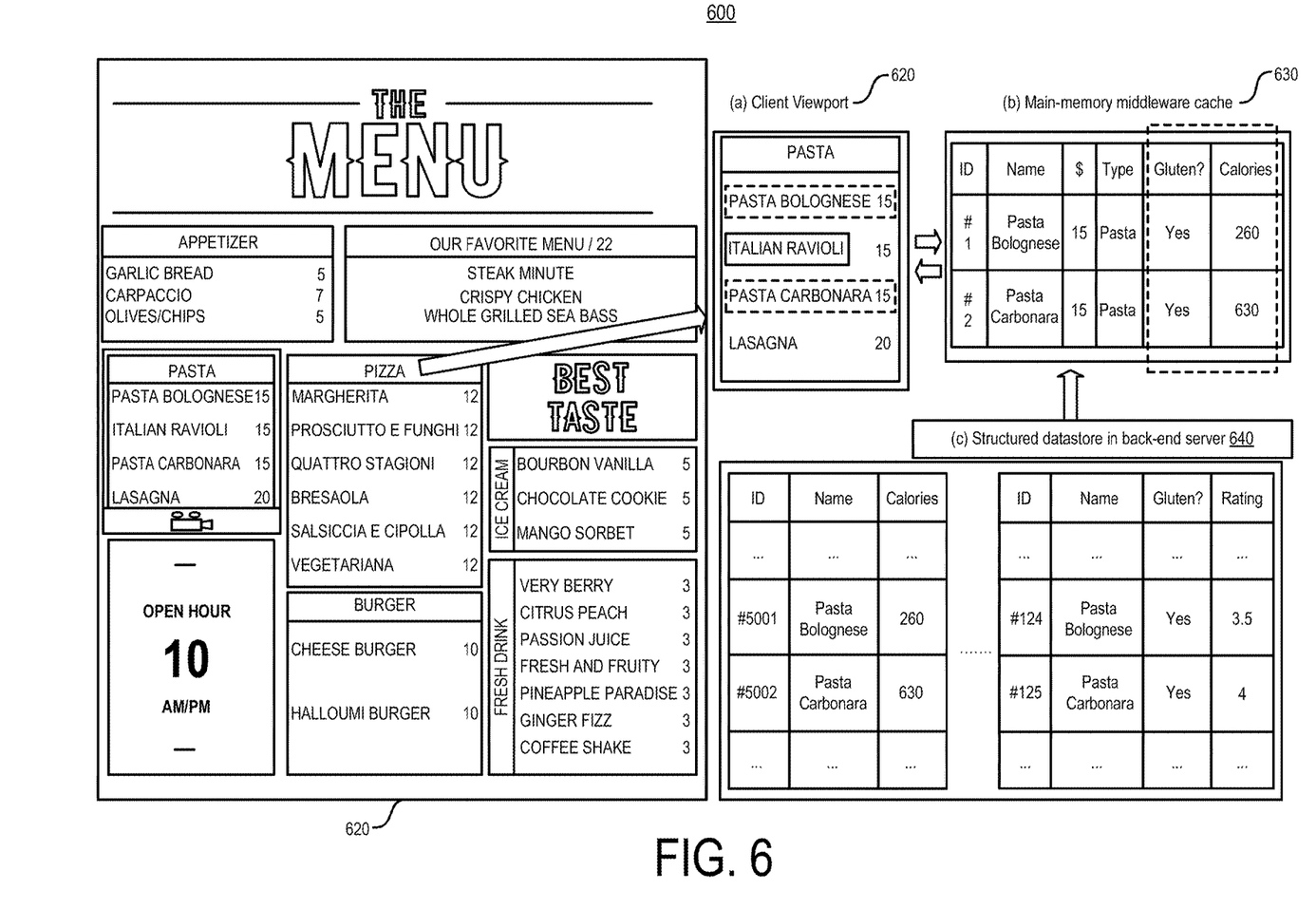
FIG. 6 is an illustration useful for describing aspects of information extraction, enrichment, and caching for AR applications.

FIG. 6 is an illustration 600 useful for describing aspects of information extraction, enrichment, and caching for AR applications. The illustration 600 shows interactions between a camera-interface 610 with a client viewport 620, a main-memory middleware cache 630, and a structured datastore in a back-end server 640.

To address the inherent multimodality of real-world data, use domain-specific approaches to represent a queried item as a fixed-length vector. For example, local and global characteristics of image and videos can be captured as feature vectors using SIFT and GIS. Similarly, TFIDF and doc2vec based approaches can be used to encode OCR'ed text inputs. Deep neural networks can also be used to automatically learn state-of-the-art feature vectors for various data sources including text and images. Vector-based embedding techniques can be used to represent a data unit in cloud-based datastores too, including relational tuples in structured datastores 640. The task of gathering supplementary information therefore translates to approximate nearest neighbor search in a common metric space representing both the queried item and data units in the cloud-based datastore. A supervised approach may be implemented to learn this metric space from manually curated gold-standard data.

In accordance with aspects provided herein, a user cycles through the following steps for exploring data in an AR setting: (a) they analyze the result of the previous request, (b) they perform an action in the camera-based interface to browse (e.g., pan to a different viewport), they augment (e.g., double tap for supplementary data) or they refine (e.g., zoom in on an object) their request, and (c) wait for the result to be overlaid in their camera-view. The third step may be eliminated by predicting the next user-query (with high probability), precomputing its results and storing it in the middleware cache 630 while the user is still in the first step. These speed up server-side performance and provides the user with a seamless interactive experience. A prediction model may be trained based on a user's current frame of mind and past interactions for this purpose.

The middleware layer is also responsible for executing an information extraction task within the current viewport 620 when the user single-taps on an item in their camera-interface 610. An interaction grammar and data model is described further herein. Unlike data on the screen, data in the real-world typically persists throughout the query session (e.g., paper-printed data). Therefore, existing data is augmented instead of replacing it, as all queries and inter-action with the data should be performed as a direct manipulation. This motivates the need of a well-defined interaction grammar and a data model fit for representing results as an additive AR overlay.

Immersive interactivity is ensured by employing a main-memory cache 630 in the middleware layer. It predicts the next queries (dotted boxes in the client viewport 620), precomputes them and stores the results in middleware cache (630 shows a precomputed fusion query). Results are retrieved from the cache in the next timestep.

The system provides: (1) an interaction grammar to query multimodal data appearing in the real-world, (2) an operator for enriching real-world data leveraging remote datastores, (3) a performant framework that allows to perform these operations within interactive latency, and (4) a data model for querying and visually representing results in augmented reality paradigm.

Figure 7:
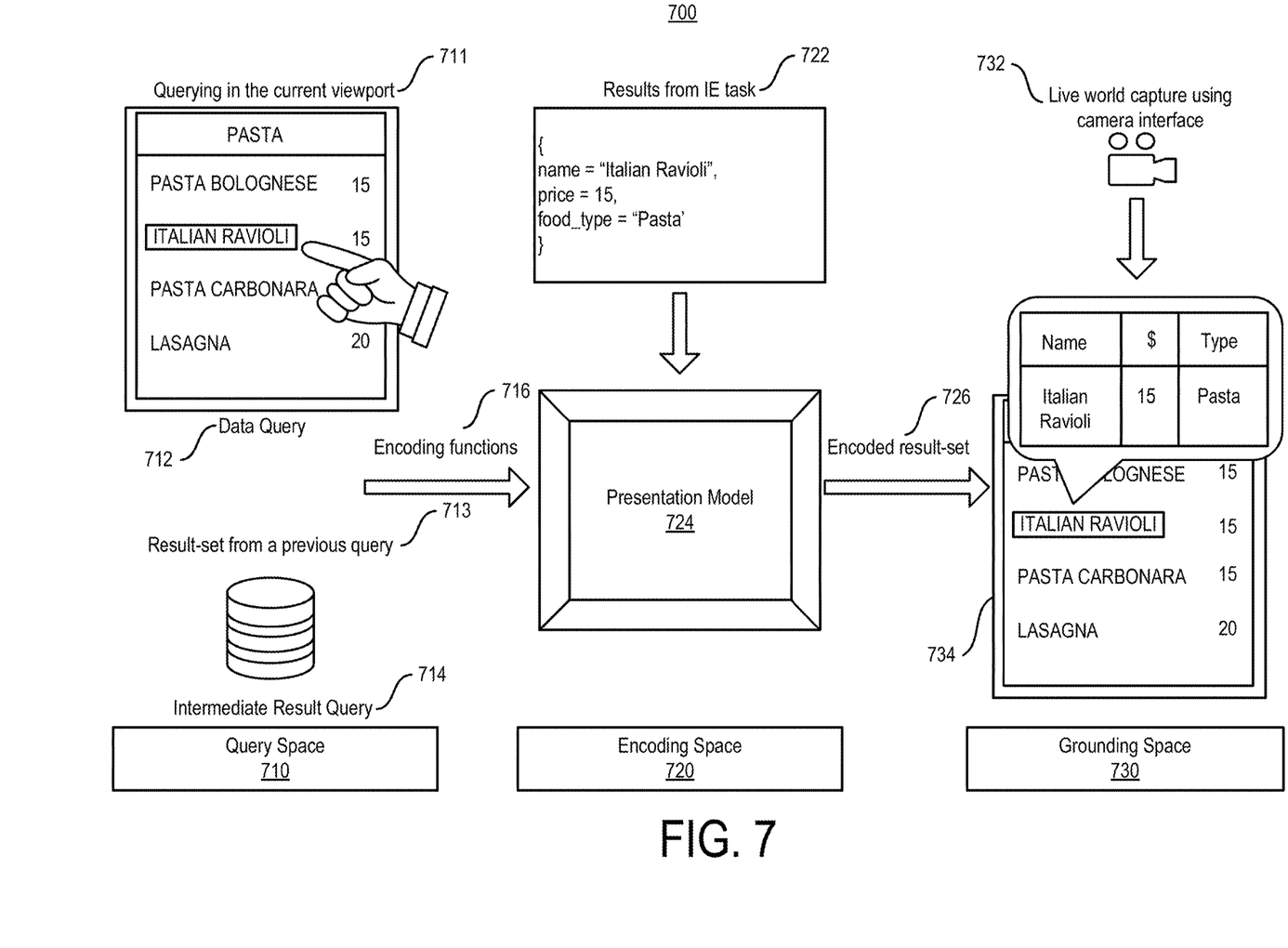
FIG. 7 is an illustration of an implementation of a data model for information extraction, enrichment, and caching for AR applications.

FIG. 7 is an illustration of an implementation of a data model 700 for information extraction, enrichment, and caching for AR applications.

The data model 700 is described. Users explore real-world data by interacting with objects that appear in its viewport and generating a query as shown in 711. Each user-interaction is mapped to a query in the query space 710 by the client interface. Results returned by these queries are overlaid on top of the current camera-view 732. Generating an encoded result-set 726 for visualization and anchoring it to the queried object as shown in 734 is the responsibility of the result space.

Regarding query space 710, the set of queries comprises two different classes of queries: (a) data queries 712 and (b) intermediate result queries 714.

Data queries 712 take real-world data that appear in camera-view as input. Two types of data queries are supported in each user session, retrieval and fusion. A retrieval operation on a real-world object retrieves a set of named entities from the viewport that have some semantic relationship with the queried object. The fusion operator, on other hand, retrieves supplementary data related to the queried object that are not available within the current viewport. Leverage remote datastores for this purpose. The result-set is returned in a structured format by a data query operator and visualized in a tabular form in client's camera-interface.

Regarding intermediate result queries 714, these are analytical queries on the result-set returned by a previous query 713. Leverage a relational data model to interpret the query results. Each query session is modeled as a series of operations that successively modify the result-set. Analytical queries covered by this query class are the following relational operations: selection, projection, group by, aggregate, and ordering.

With respect to result space, the task of rendering a result-set is carried out by translating the underlying relational data model from the query space to actual visual artifacts. This is the responsibility of two complementary sub-spaces. The encoding space 720 produces visual artifacts that encode the result-set which are then overlaid in live camera-view in the grounding space. These grounded visual artifacts denote the final result-set representation in client's camera-interface.

The encoding space 720 is described. One of the main challenges of visualizing result-sets in augmented reality setting is the presence of reality itself. Unlike virtual environments (e.g., browsers) where objects can be replaced or removed, data in the real-world typically persists through the entire session. Therefore, results of a data query operation need to be rendered in an additive fashion with respect to the queried object. No modification is made to the actual real-world object. There are two main components of the encoding space: a presentation model 724 and a set of encoding functions 716.

The presentation model 724 provides a mapping between the relational model that represents the result-set (e.g., from the IE task 722) and the relative position information (In a 2-D coordinate system for flat displays of real-world in client's camera-interface) of the queried object in client's camera-view.

The encoding functions 716, on other hand, are responsible for producing the visual artifacts for each data unit in the result-set (e.g., a cell for each named entity in the tabular representation). Note that although information on the relative coordinate system is required from the presentation model to position the visual artifacts corresponding to the result-set, this is not limited by its dimensions. For example, it can be chosen to encode the calorific information of a menu item using a 3-D pie-chart with divergent colors on top of the table rows, anchored just above the menu item in camera-view. The ability to define similar, new encodings without redefining the data model is a major benefit afforded by the encoding space. New encoding functions can be added or swapped based on the task.

The grounding space 730 is described. Although the encoding space 720 provides a static visual representation the result-set, it does not anchor it in reality. This is the responsibility of the grounding space 730. It takes visual artifacts rendered by the presentation model 724 and anchors them in a dynamic coordinate system. As real-world data is tracked through live camera feed in each query session, the location of the queried object may change as the camera moves. Anchoring the visual artifacts from the encoding space 720 relative to the queried object is the responsibility of the grounding space 730. The method used for live tracking of real-world objects in an implementation is described further herein.

The query space 710 represents the finite set of queries supported by the framework. The result-set returned by a query is encoded as visual artifacts by the encoding space 720 and rendered on top of live camera-view as an AR-based overlay by the grounding space 730.

The interaction model is described. In some implementations, real-world data exploration through two-dimensional camera-based viewports in an augmented reality setting is provided. Here, exploration means browsing objects that appearing in the current viewport or performing analytical queries on each object, but not modifying it. Assume that each query triggers an incremental update to the result-set, one object at a time. For example, in the earlier example, if the user wants to compare the calorific value of one menu item to another, they need to query both items one-at-a-time to retrieve their calorific information. These assumptions define a specific class of data exploration interfaces, characterized by the following rules: (a) the client interface supports a finite set of interactions (i.e., no open-ended text boxes), (b) the interactions do not modify the queried object, (c) real-world objects appearing in the client's camera-view can only be queried one-at-a-time, and (d) each query affects an incremental change to the result-set.

Regarding the user analysis phases, the space of user interactions is partitioned into four phases. Each phase represents the user's current frame of mind.

(A) Retrieval: User taps on an object in their camera-view to extract named entities that are semantically related to the queried object.

(B) Fusion: Double tapping on an object in the camera-view retrieves named entities related to the queried object from a cloud-based datastore. Typically, these named entities either do not appear or cannot be extracted from the current viewport.

(C) Sensemaking: User gathers insight from the result-set rendered in their viewport from a previous query. This is facilitated by allowing the user to execute analytical queries (i.e., intermediate result queries) on the result-set using gesture-based interactions.

(D) Navigation: To transition from one phase to another, a user may have to pan their camera to a new viewport or zoom in on their current viewport.

User's goal changes based on the phase they are currently in. For example, in the navigation phase, the user shifts the focus of their analysis from one object to another. In the retrieval phase, on other hand, the goal is to extract all named entities related to the queried object that appear in the current viewport.

Interaction grammar is described. The framework supports the following gestures on its client interface as valid interactions. Each gesture initiates a new analysis phase.

(A) Drag-to-select: User selects the item to query by performing a dragging gesture to draw a bounding-box around the item on the camera-based client interface.

(B) Tap: Tapping on an object in the viewport extracts named entities appearing in the viewport that are semantically related to the queried object. In other words, it triggers the retrieval operator.

(C) Double tap: Double tapping on the object in the viewport retrieves relevant supplementary data from remote datastore that may not be available in the viewport. In other words, double tapping on an object triggers the fusion operator.

(D) Pan: A user may pan the camera-enabled client towards a new viewport to initiate a new analysis phase.

(E) Zoom: Zooming on an object in the current camera-view initializes the navigation phase and updates the current viewport.

Classifying a user interaction to one of these gestures and initializing a new analysis phase is the responsibility of the client interface.

Figure 8:
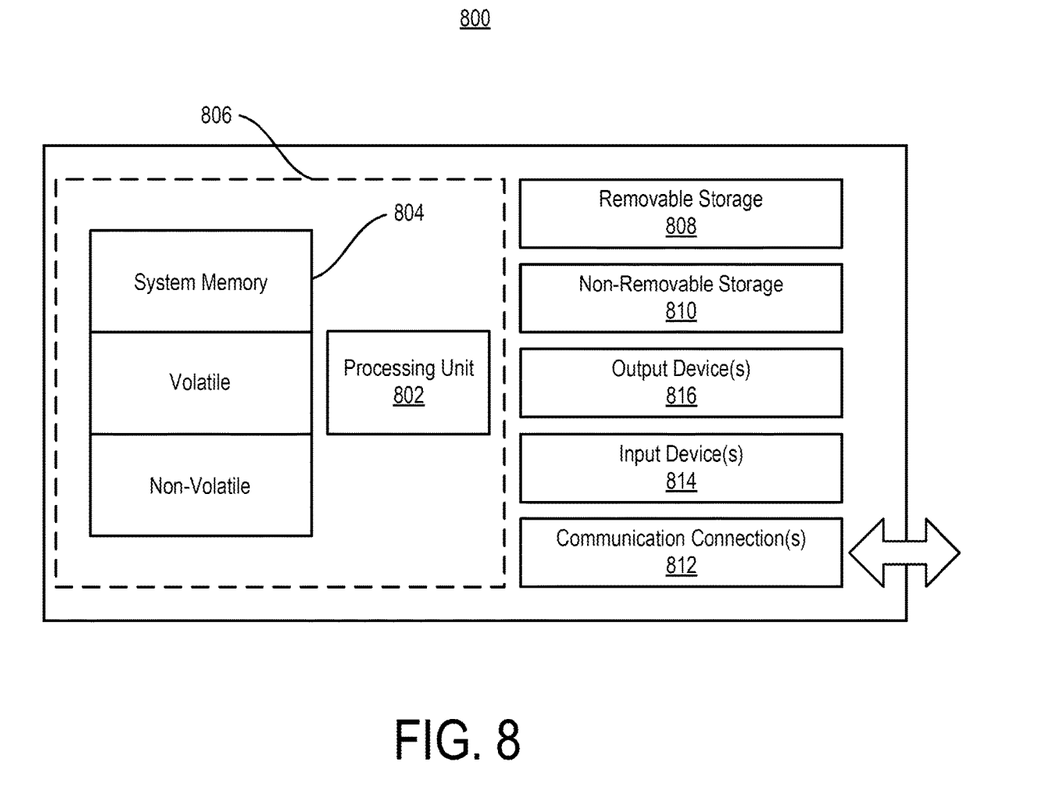
FIG. 8 shows an exemplary computing environment in which example embodiments and aspects may be implemented.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well-known in the art and need not be discussed at length here.

In an implementation, a method comprises: receiving real-world data at a viewport of a computing device; receiving a client selection of an item of the real-world data; retrieving data relating to the item from storage; and presenting the data in the client viewport with at least some of the real-world data.

Implementations may include some or all of the following features. The computing device comprises a smartphone. The method further comprises: receiving an additional client selection of an additional item of the real-world data after presenting the data in the client viewport; retrieving supplemental data relating to the additional item from storage; and presenting the supplemental data in the client viewport with at least some of the data and at least some of the real-world data. Retrieving the supplemental data comprises performing data fusion against cloud-based datastores. Retrieving the data comprises retrieving result-sets from a middleware cache. The method further comprises in case of a cache miss, retrieving the data using an information extraction engine or from a back-end server. The viewport is associated with an augmented reality application. The real-world data is live real-world data in real-time. The client selection is a query in the viewport.

In an implementation, a system comprises: a datastore comprising data relating to items in a real-world; and a computing device configured to: receive real-world data from a viewport; receive a client selection of an item of the real-world data; retrieve data relating to the item from storage; and present the data to the client viewport with at least some of the real-world data.

Implementations may include some or all of the following features. The viewport is comprised within a smartphone. The computing device is further configured to: receive an additional client selection of an additional item of the real-world data after presenting the data to the client viewport; retrieve supplemental data relating to the additional item from storage; and present the supplemental data to the client viewport with at least some of the data and at least some of the real-world data. Retrieving the supplemental data comprises performing data fusion against cloud-based datastores. Retrieving the data comprises retrieving result-sets from a middleware cache using a prediction engine. Retrieving the data comprises retrieving the data using an information extraction engine or from a back-end server. The system further comprises an augmented reality application configured to receiving the client selection and present the data. The real-world data is live real-world data in real-time.

In an implementation, a system comprises: a middleware cache; a cache manager; and a prediction engine configured to receive a query from a client running an augmented reality application, wherein the query pertains to an item in a real-world, and configured to send the query to the cache manager for retrieval of a data result for the query from the middleware cache.

Implementations may include some or all of the following features. The system further comprises an information extraction engine configured to retrieve the data result for the query in case of a cache miss. The system further comprises a back-end server configured to retrieve the data result for the query in case of a cache miss.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving real-world data at a client viewport of a computing device;
   receiving a client selection of an item of the real-world data that is associated with a first query in the client viewport;
   identifying, using a first prediction model, a current user analysis phase;
   determining, using a second prediction model, a predicted next user interaction, wherein the second prediction model is trained based at least in part on user past interactions corresponding with one or more of a retrieval phase, fusion phase, sensemaking phase, and a navigation phase;
   while a user is analyzing a result-set of the first query in the current user analysis phase, precomputing data based at least in part on the predicted next user interaction by performing a fusion query operation to retrieve supplemental data related to the item that is not available in the client viewport;
   storing the precomputed data in a middleware cache during the current user analysis phase;
   responsive to receiving a subsequent user interaction associated with a subsequent query, retrieving at least a portion of the precomputed data relating to the item from the middleware cache;
   interpreting a subsequent query result using a relational data model;
   modifying the result-set using the precomputed data in an additive fashion;
   rendering the modified result-set by translating the relational data model from a query space and encoding at least a portion of the precomputed data to generate to at least one visual artifact; and
   outputting the at least one visual artifact in the client viewport with at least some of the real-world data.

2. The method of claim 1, wherein the computing device comprises a smartphone.

3. The method of claim 1, wherein retrieving the supplemental data comprises performing data fusion against cloud-based datastores.

4. The method of claim 1, further comprising in case of a cache miss, retrieving data using an information extraction engine or from a back-end server.

5. The method of claim 1, wherein the client viewport is associated with an augmented reality application.

6. The method of claim 1, wherein the real-world data is live real-world data in real-time.

7. A system comprising:
   a datastore comprising data relating to items in a real-world; and
   a computing device configured to:
      receive real-world data from a client viewport;
      receive a client selection of an item of the real-world data that is associated with a first query in the client viewport;
      identify, using a first prediction model, a current user analysis phase;
      determine, using a second prediction model, a predicted next user interaction, wherein the second prediction model is trained based at least in part on user past interactions corresponding with one or more of a retrieval phase, fusion phase, sensemaking phase, and a navigation phase;
      while a user is analyzing a result-set of the first query in the current user analysis phase, precompute data from the datastore based at least in part on the predicted next user interaction by performing a fusion query operation to retrieve supplemental data related to the item that is not available in the client viewport;
      store the precomputed data in a middleware cache during the current user analysis phase;
      responsive to receiving a subsequent user interaction associated with a subsequent query, retrieve at least a portion of the precomputed data relating to the item from the middleware cache;
      interpret a subsequent query result using a relational data model;
      modify the result-set using the precomputed data in an additive fashion;
      render the modified result-set by translating the relational data model from a query space and encoding at least a portion of the precomputed data to generate to at least one visual artifact; and
      output the at least one visual artifact to the client viewport with at least some of the real-world data.

8. The system of claim 7, wherein the client viewport is comprised within a smartphone.

9. The system of claim 1, wherein retrieving the supplemental data comprises performing data fusion against cloud-based datastores.

10. The system of claim 7, wherein retrieving the precomputed data comprises retrieving the precomputed data using an information extraction engine or from a back-end server.

11. The system of claim 7, further comprising an augmented reality application configured to receive the client selection and present the real world data.

12. The system of claim 7, wherein the real-world data is live real-world data in real-time.

13. A computing device comprising:
   a middleware cache;
   a cache manager; and
   a prediction engine comprising a first prediction model and a second prediction model configured to:
      receive a client selection of an item of real-world data that is associated with a first query from a client running an augmented reality application
      identify, using the first prediction model, a current user analysis phase;
      determine, using the second prediction model, a predicted next user interaction, wherein the second prediction model is trained based at least in part on user past interactions corresponding with one or more of a retrieval phase, fusion phase, sensemaking phase, and a navigation phase;

while a user is analyzing a result-set of the first query in the current user analysis phase, precompute data based at least in part on the predicted next user interaction by performing a fusion query operation to retrieve supplemental data related to the item that is not available in a client viewport of the computing device;

store the precomputed data in a middleware cache during the current user analysis phase; and responsive to receiving a subsequent user interaction associated with a subsequent query, retrieve at least a portion of the precomputed data relating to the item from the middleware cache;

interpret a subsequent query result using a relational data model;

modify the result-set using the precomputed data in an additive fashion;

render the modified result-set by translating the relational data model from a query space and encoding at least a portion of the precomputed data to generate to at least one visual artifact; and output the at least one visual artifact to the client viewport with at least some of the real-world data.

14. The computing device of claim 13, further comprising an information extraction engine configured to retrieve a data result for the subsequent query in case of a cache miss.

15. The computing device of claim 13, further comprising a back-end server configured to retrieve a data result for the subsequent query in case of a cache miss.

* * * * *